United States Patent
Ku

(10) Patent No.: US 10,218,871 B2
(45) Date of Patent: Feb. 26, 2019

(54) LIGHT SCANNING UNIT AND IMAGE FORMING APPARATUS HAVING THE SAME

(71) Applicant: S-PRINTING SOLUTION CO., LTD., Suwon-si, Gyeonggi-do (KR)

(72) Inventor: Jong-Wuk Ku, Suwon-si (KR)

(73) Assignee: HP PRINTING KOREA CO., LTD., Suwon-Si (KR)

( * ) Notice: Subject to any disclaimer, the term of this patent is extended or adjusted under 35 U.S.C. 154(b) by 35 days.

(21) Appl. No.: 15/353,289

(22) Filed: Nov. 16, 2016

(65) Prior Publication Data

US 2017/0149994 A1 May 25, 2017

(30) Foreign Application Priority Data

Nov. 20, 2015 (KR) .................. 10-2015-0163530

(51) Int. Cl.
*G03G 15/043* (2006.01)
*H04N 1/028* (2006.01)
(Continued)

(52) U.S. Cl.
CPC ....... *H04N 1/0283* (2013.01); *G03G 15/0409* (2013.01); *H04N 1/02825* (2013.01);
(Continued)

(58) Field of Classification Search
CPC ...... G02B 26/10; G02B 26/12; G02B 26/125; G02B 26/126; G02B 26/129; B41J 2/451; B41J 2/471; B41J 2/47
See application file for complete search history.

(56) References Cited

U.S. PATENT DOCUMENTS 6,801,239 B2 * 10/2004 Nakahata ............. G02B 26/123
347/243
7,110,016 B2 * 9/2006 Suzuki ..................... B41J 2/473
347/233
(Continued)

FOREIGN PATENT DOCUMENTS

JP  2001-264655  9/2001
JP  2006-171446  6/2006
(Continued)

OTHER PUBLICATIONS

International Search Report dated Feb. 28, 2017 from International Patent Application No. PCT/KR2016/013332. 3 pages.

*Primary Examiner* — Cheukfan Lee
(74) *Attorney, Agent, or Firm* — Staas & Halsey LLP

(57) ABSTRACT

A plurality of light sources, an optical deflector including a rotational member configured to be rotational about an axis of rotation thereof, and a plurality of reflective members, are provided in a light scanning unit for an image forming apparatus. The optical deflector is arranged to deflect light incident obliquely from the plurality of light sources and the plurality of reflective members are arranged to reflect the light deflected by the optical deflector to a plurality of surfaces, which are to be scanned and correspond to the plurality of light sources, and arranged such that scan lines on opposite surfaces with respect to the axis of rotation of the optical deflector among the plurality of surfaces to be scanned are bent in the same direction.

20 Claims, 9 Drawing Sheets

(51) Int. Cl.
   *H04N 1/06*      (2006.01)
   *H04N 1/29*      (2006.01)
   *G03G 15/04*     (2006.01)

(52) U.S. Cl.
   CPC ........... *H04N 1/02895* (2013.01); *H04N 1/06* (2013.01); *H04N 1/29* (2013.01); *G03G 15/043* (2013.01)

(56) References Cited

U.S. PATENT DOCUMENTS

| | | | | |
|---|---|---|---|---|
| 7,126,735 | B1* | 10/2006 | Kinoshita | G02B 26/123 359/204.1 |
| 2003/0179428 | A1* | 9/2003 | Suzuki | B41J 2/473 359/204.2 |
| 2003/0234857 | A1 | 12/2003 | Nakahata | |
| 2006/0017996 | A1* | 1/2006 | Tamaru | B41J 2/473 359/204.1 |
| 2006/0017997 | A1* | 1/2006 | Tamaru | G02B 26/123 359/204.1 |
| 2006/0188290 | A1* | 8/2006 | Sato | G03G 15/5008 399/167 |
| 2007/0058231 | A1* | 3/2007 | Kim | G02B 26/123 359/205.1 |
| 2007/0165097 | A1* | 7/2007 | Kato | G02B 26/123 347/232 |
| 2007/0258121 | A1* | 11/2007 | Kim | G02B 26/123 359/204.1 |
| 2009/0092417 | A1* | 4/2009 | Shimomura | G03G 15/011 399/223 |
| 2011/0019254 | A1* | 1/2011 | Iwata | G02B 26/123 359/204.1 |
| 2013/0176602 | A1* | 7/2013 | Miyake | G02B 26/0825 358/474 |
| 2013/0258024 | A1* | 10/2013 | Matsushita | G03G 15/011 347/118 |
| 2016/0223812 | A1* | 8/2016 | Kudo | G02B 26/125 |
| 2017/0108794 | A1* | 4/2017 | Shimadu | G03G 15/043 |

FOREIGN PATENT DOCUMENTS

| | | |
|---|---|---|
| JP | 2007-155838 | 6/2007 |
| JP | 2007-240968 | 9/2007 |
| JP | 2008-15139 | 1/2008 |
| JP | 2008-15140 | 1/2008 |
| JP | 2008-40136 | 2/2008 |
| JP | 2008-76586 | 4/2008 |
| JP | 2008-76935 | 4/2008 |
| JP | 2008-83162 | 4/2008 |
| JP | 2008-170485 | 7/2008 |
| JP | 2008-170487 | 7/2008 |
| JP | 2010-169782 | 8/2010 |
| JP | 2010-191292 | 9/2010 |
| JP | 2011-59559 | 3/2011 |
| JP | 2011-95383 | 5/2011 |
| JP | 2011-100007 | 5/2011 |
| JP | 2011-180222 | 9/2011 |
| JP | 2013-76995 | 4/2013 |

\* cited by examiner

LIGHT SCANNING UNIT AND IMAGE FORMING APPARATUS HAVING THE SAME

CROSS-REFERENCE TO RELATED APPLICATIONS

This application claims the priority benefit of Korean Patent Application No. 10-2015-0163530, filed on Nov. 20, 2015, in the Korean Intellectual Property Office, the disclosure of which is incorporated herein by reference in its entirety.

BACKGROUND

1. Field

Embodiments of the disclosure relate to a light scanning unit (LSU) and an image forming apparatus including the same, and more particularly, to an LSU capable of improving the quality of an image and an image forming apparatus including the same.

2. Description of the Related Art

An electrophotographic image forming apparatus forms an image by forming an electrostatic latent image by scanning light beams on photosensitive bodies using a light scanning unit (LSU), generating a developed image from the electrostatic latent image using a developer such as toner, transferring the developed image onto a print medium, and fixing the developed image on the print medium.

In general, an LSU employed in devices, such as a laser printer, a digital copying machine, a barcode reader, and a fax machine, forms a latent image on a surface to be exposed by main-scanning using a beam deflector and sub-scanning using rotation of photosensitive drums. In particular, a tandem type image-forming apparatus having a plurality of objects which are to be exposed and correspond to various color components has been used to obtain a multi-color image. A color laser printer is one example of the tandem type image-forming apparatus. The tandem type image-forming apparatus employs a tandem type LSU which forms an image of light on photosensitive drums corresponding to various color components, e.g., yellow, magenta, cyan, and black.

The tandem type LSU includes a beam deflector arranged in a light path to deflect a beam. When the beam deflector is installed commonly for a plurality of light beams, the number of components of an optical element may be decreased and the structure thereof may be simplified. Thus, an image forming apparatus including the LSU may be manufactured in a compact size and at lower costs. Recently, because of these advantages, research has been actively conducted on the tandem type LSU having a structure in which a beam deflector is commonly used with respect to a plurality of light beams. In order to independently scan a plurality of light beams on photosensitive drums corresponding thereto, the plurality of light beams should be emitted to a beam deflector rotated at a high speed, and spatially separated from one another after they are deflected. To this end, the light beams may be spatially separated by controlling light beams emitted from different light sources to be obliquely incident on the beam deflector, which is rotatively driven, in a diagonal direction. However, in such an oblique incident-light system, scan lines are not formed linearly but may distort in a curved shape, such as a bow, on the photosensitive drums. Thus, pitches between scan lines are not maintained constant, thereby degrading the quality of an image. In particular, in a color-image forming apparatus which forms a color image by overlapping different single-color images with each other, images may be overlapped crisscross and thus desired colors and a desired image cannot be achieved.

SUMMARY

Therefore, it is an aspect of the disclosure to provide a light scanning unit (LSU) capable of improving the quality of an image degraded due to bent scan lines, and an image forming apparatus having the same.

It is another aspect of the disclosure to provide an LSU which may be manufactured in a compact size, and an image forming apparatus having the same.

Additional aspects and/or advantages of the disclosure will be set forth in part in the description which follows and, in part, will be apparent from the description, or may be learned by practice of the disclosure.

In accordance with an aspect of the disclosure, a light scanning unit may include a plurality of light sources, an optical deflector including a rotational member configured to be rotational about an axis of rotation thereof, and arranged to deflect light incident obliquely from the plurality of light sources, and a plurality of reflective members arranged to reflect the light deflected by the optical deflector to a plurality of surfaces, which are to be scanned and correspond to the plurality of light sources, and arranged such that scan lines on opposite surfaces with respect to the axis of rotation of the optical deflector among the plurality of surfaces to be scanned are bent in the same direction.

The plurality of reflective members may be arranged to be asymmetrical about the axis of rotation of the optical deflector.

The plurality of surfaces to be scanned may include a first surface arranged at one side with respect to the axis of rotation and a second surface arranged at another side. The plurality of reflective members may include a first reflective member arranged in a light path between the optical deflector and the first surface, and configured to reflect light from the optical deflector and a second reflective member arranged in a light path between the optical deflector and the second surface, configured to reflect light from the optical deflector, and arranged to be spaced from the first reflective member in a direction of the axis of rotation of the optical deflector.

The plurality of light sources may include a first light source configured to generate light to be scanned on the first reflective member, and arranged below a plane which passes through the optical deflector and is perpendicular to the axis of rotation of the optical deflector and a second light source configured to generate light to be scanned on the second reflective member, and arranged above the plane.

Each of the first reflective member and the second reflective member may include a reflection point at which light incident from the optical deflector is reflected. The reflection point on the first reflective member may be located above a plane which passes through the optical deflector and is perpendicular to the axis of rotation of the optical deflector, and the reflection point on the second reflective member is located below the plane.

The first and second reflective members may be arranged to be spaced the same distance from the axis of rotation of the optical deflector.

The plurality of reflective members may include a third reflective member configured to reflect light reflected by the first reflective member to the first surface and a fourth reflective member configured to reflect light reflected by the second reflective member to the second surface.

The third and fourth reflective members may be arranged such that light reflected from the third and fourth reflective members is not interfered with a light path from the optical deflector to the first and second reflective members.

The plurality of surfaces to be scanned further may include a third surface arranged more distant from the optical deflector than the first surface and a fourth surface arranged more distant from the optical deflector than the second surface. The plurality of reflective members may include a fifth reflective member including a reflection point at which light deflected by the optical deflector is reflected to the third surface, the reflection point located below the plane and a sixth reflective member including a reflection point at which light deflected by the optical deflector is reflected to the fourth surface, the reflection point located above the plane.

The fifth reflective member and the sixth reflective member may be arranged to be spaced a first distance from each other in the direction of the axis of rotation of the optical deflector, and the third surface and the fourth surface may be arranged to be spaced the first distance from each other in the direction of the axis of rotation of the optical deflector.

The fifth and sixth reflective members may be arranged to be spaced the same distance from the axis of rotation of the optical deflector.

The light scanning unit further may include an optical imaging system including at least two optical imaging devices configured to form an image of light deflected by the optical deflector on the plurality of surfaces to be scanned, and arranged in a light path between the optical deflector and the plurality of surfaces to be scanned.

The optical imaging system may be an F-theta lens.

At least two F-theta lenses may be provided in the light path.

In accordance with an aspect of the disclosure, an image forming apparatus may include a plurality of photosensitive bodies arranged in parallel and a light scanning unit configured to form an electrostatic latent image on the plurality of photosensitive bodies. The light scanning unit may include a plurality of light sources, an optical deflector configured to deflect light incident obliquely from the plurality of light sources and a plurality of reflective members configured to reflect light deflected by the optical deflector to the plurality of photosensitive bodies. The plurality of reflective members may include a plurality of primary reflective members which are arranged to correspond to the plurality of photosensitive bodies and each of which may include a reflection point at which light from the optical deflector is reflected. The reflection points on the plurality of primary reflective members may be arranged in an alternate pattern with respect to a plane such that scan lines on the plurality of photosensitive bodies are bent in the same direction. The plane passes through the optical deflector and is perpendicular to an axis of rotation of the optical deflector.

Pairs of primary reflective members among the plurality of primary reflective members may be spaced the same distance from the axis of rotation of the optical deflector.

The plurality of reflective members further may include a plurality of secondary reflective members provided to correspond to the plurality of primary reflective members so as to reflect light reflected from the plurality of primary reflective members to the plurality of photosensitive bodies. The same number of secondary reflective members may be arranged to correspond to opposite primary reflective members with respect to the axis of rotation of the optical deflector, and a number of secondary reflective members arranged to correspond to each of the primary reflective members adjacent to the optical deflector among the plurality of primary reflective members may be odd-number times greater than a number of secondary reflective members arranged to correspond to each of the other primary reflective members arranged farther from the optical deflector.

An outermost first reflective member in one direction and an outermost first reflective member in another direction among the plurality of primary reflective members may be spaced a first distance from each other in a direction of the axis of rotation of the optical deflector, A photosensitive body on which an electrostatic latent image is formed by light passing through one of the outermost first reflective members and a photosensitive body on which an electrostatic latent image is formed by light passing through the other outermost first reflective member among the plurality of photosensitive bodies may be spaced the first distance from each other in the direction of the axis of rotation of the optical deflector.

In accordance with an aspect of the disclosure, a light scanning unit may include a plurality of light sources, an optical deflector including a rotational member and arranged to deflect light incident obliquely from the plurality of light sources, a first surface which is to be scanned and to which light deflected by the optical deflector is transmitted, a second surface which is to be scanned and is arranged opposite to the first surface with respect to an axis of rotation of the optical deflector and a plurality of reflective members. The plurality of reflective members may include first and second reflective members arranged to reflect light deflected by the optical deflector and third and fourth reflective members configured to reflect the light reflected from the first and second reflective members to the first and second surfaces. The first reflective member may be provided to reflect light emitted above a plane from the optical deflector to the third reflective member. The plane passes through the optical deflector and is perpendicular to the axis of rotation of the optical deflector, and the second reflective member may be provided to reflect light emitted below the plane from the optical deflector to the fourth reflective member.

The light scanning unit further may include a third surface which is to be scanned and may be arranged farther from the optical deflector than the first surface and a fourth surface which is to be scanned and may be arranged farther from the optical deflector than the second surface. The plurality of reflective members may include a fifth reflective member configured to reflect light deflected by the optical deflector to the third surface, and light emitted below the plane from the optical deflector and a sixth reflective member configured to reflect light deflected by the optical deflector to the fourth surface, and light emitted above the plane from the optical deflector.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
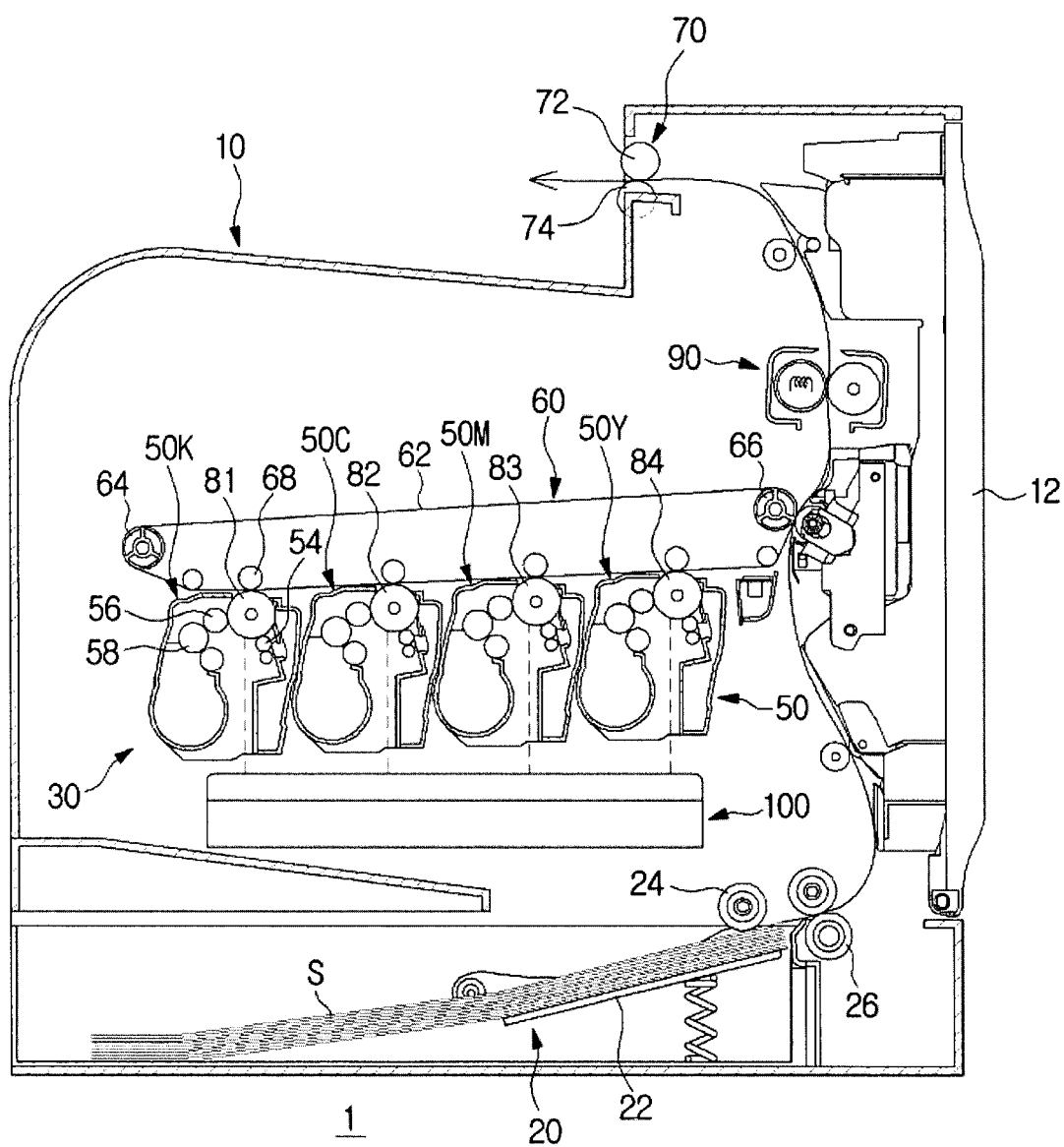
FIG. 1 is a cross-sectional view of an image forming apparatus in accordance with an embodiment of the disclosure.

Reference will now be made in detail to example embodiments of the disclosure, the examples of which are illustrated in the accompanying drawings, wherein like reference numerals refer to like elements throughout. The embodiments are described below to explain the disclosure by referring to the figures.

The embodiments set forth herein and the structures illustrated in the drawings are merely examples of the disclosure, and various modified examples thereof would have been made at the filing date of the application.

The same reference numerals or signs illustrated in the drawings represent components or elements performing substantially same functions.

The terminology used herein is for the purpose of describing particular embodiments only and is not intended to be limiting of the disclosure. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof.

It will be understood that, although the terms 'first', 'second', 'third', etc., may be used herein to describe various elements, these elements should not be limited by these terms. These terms are only used to distinguish one element from another element. Thus, a first element discussed below could be termed a second element without departing from the teachings of the disclosure. The term 'and/or' includes any and all combinations of one or more of the associated listed items.

Hereinafter, embodiments of the disclosure will be described in detail with reference to the appended drawings.

FIG. 1 is a cross-sectional view of an image forming apparatus in accordance with an embodiment of the disclosure.

As illustrated in FIG. 1, an image forming apparatus 1 may include a main body 10, a print-medium supply device 20, a printing device 30, a fixing device 90, and a print-medium discharge device 70.

The main body 10 forms the exterior of the image forming apparatus 1 and supports various elements installed in the image forming apparatus 1. The main body 10 may include a cover 12 provided to close/open a portion thereof, and a main-body frame (not shown) provided in the main body 10 to support or fix these elements.

The print-medium supply device 20 supplies a print medium S to the printing device 30. The print-medium supply device 20 may include a tray 22 on which print media S are stacked, and a pickup roller 24 which picks up one sheet of the print media S stacked on the tray 22 at a time. A print medium S picked up by the pickup roller 24 is transferred toward the printing device 30 by a feed roller 26.

The printing device 30 may include a light scanning unit (LSU) 100, a developing device 50, and a transfer device 60.

The LSU 100 may include an optical system (not shown), and scans light corresponding to information regarding a yellow (Y) image, light corresponding to information regarding a magenta (M) image, light corresponding to information regarding a cyan (C) image, and light corresponding to information regarding a black (K) image on the developing device 50 according to a print signal, as will be described in detail below.

The developing device 50 forms a toner image according to image information input from an external device such as a computer. The image forming apparatus 1 in accordance with the embodiment is a color-image forming apparatus, and thus the developing device 50 may include four developing machines 50Y, 50M, 50C, and 50K respectively containing different color toners, e.g., yellow (Y), magenta (M), cyan (C), and black (K) toners.

The developing machines 50Y, 50M, 50C, and 50K may respectively include photosensitive bodies 81, 82, 83, and 84 on a surface of each of which an electrostatic latent image is formed by the LSU 100, and each may include a charge roller 54 which charges the corresponding photosensitive body among the photosensitive bodies 81, 82, 83, and 84, a developing roller 56 which supplies a toner image to the electrostatic latent image formed on the corresponding photosensitive body, and a feeder roller 58 which supplies toner to the developing roller 56.

The transfer device 60 transfers the toner images formed on the photosensitive bodies 81, 82, 83, and 84 to the print medium S. The transfer device 60 may include a transfer belt 62 which is driven in a circular motion while being in contact with the photosensitive bodies 81, 82, 83, and 84, a transfer-belt drive roller 64 which drives the transfer belt 62, a tension roller 66 which maintains a tensile force applied to the transfer belt 62 constant, and four transfer rollers 68 which transfer toner images developed on the photosensitive bodies 81, 82, 83, and 84 to the print medium S.

The print medium S is transferred at a speed which is the same as a driving speed of the transfer belt 62 while being attached to the transfer belt 62. In this case, a voltage of a polarity opposite to that of toner attached to each of the photosensitive bodies 81, 82, 83, and 84 is applied to each of the transfer rollers 68. Thus, the toner images on the photosensitive bodies 81, 82, 83, and 84 are transferred to the print medium S.

The fixing device 90 fixes the toner images, which are transferred to the print medium S by the transfer device 60, onto the print medium S.

The print-medium discharge device 70 discharges the print medium S to the outside of the main body 10. The print-medium discharge device 70 may include a discharge roller 72, and a pinch roller 74 installed opposite to the discharge roller 72.

Figure 2:
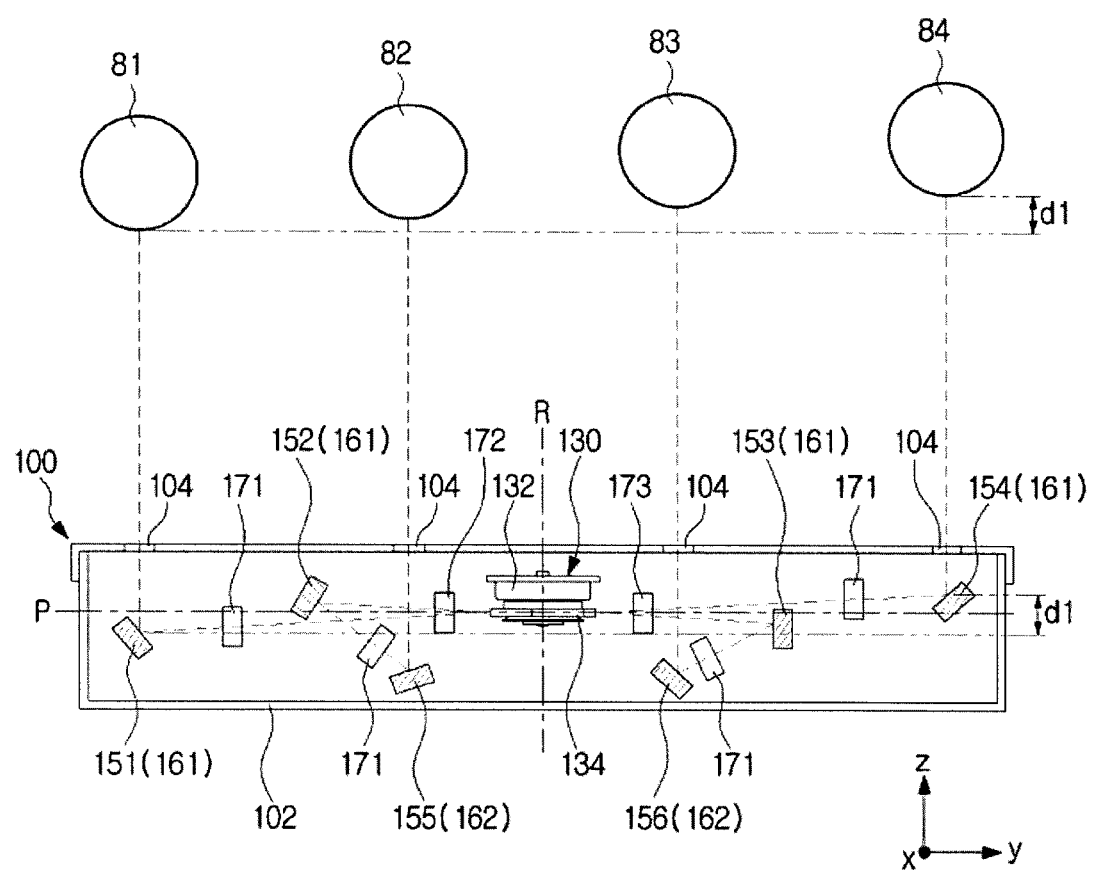
FIG. 2 is a cross-sectional view of an LSU in accordance with an embodiment of the disclosure.
Figure 3:
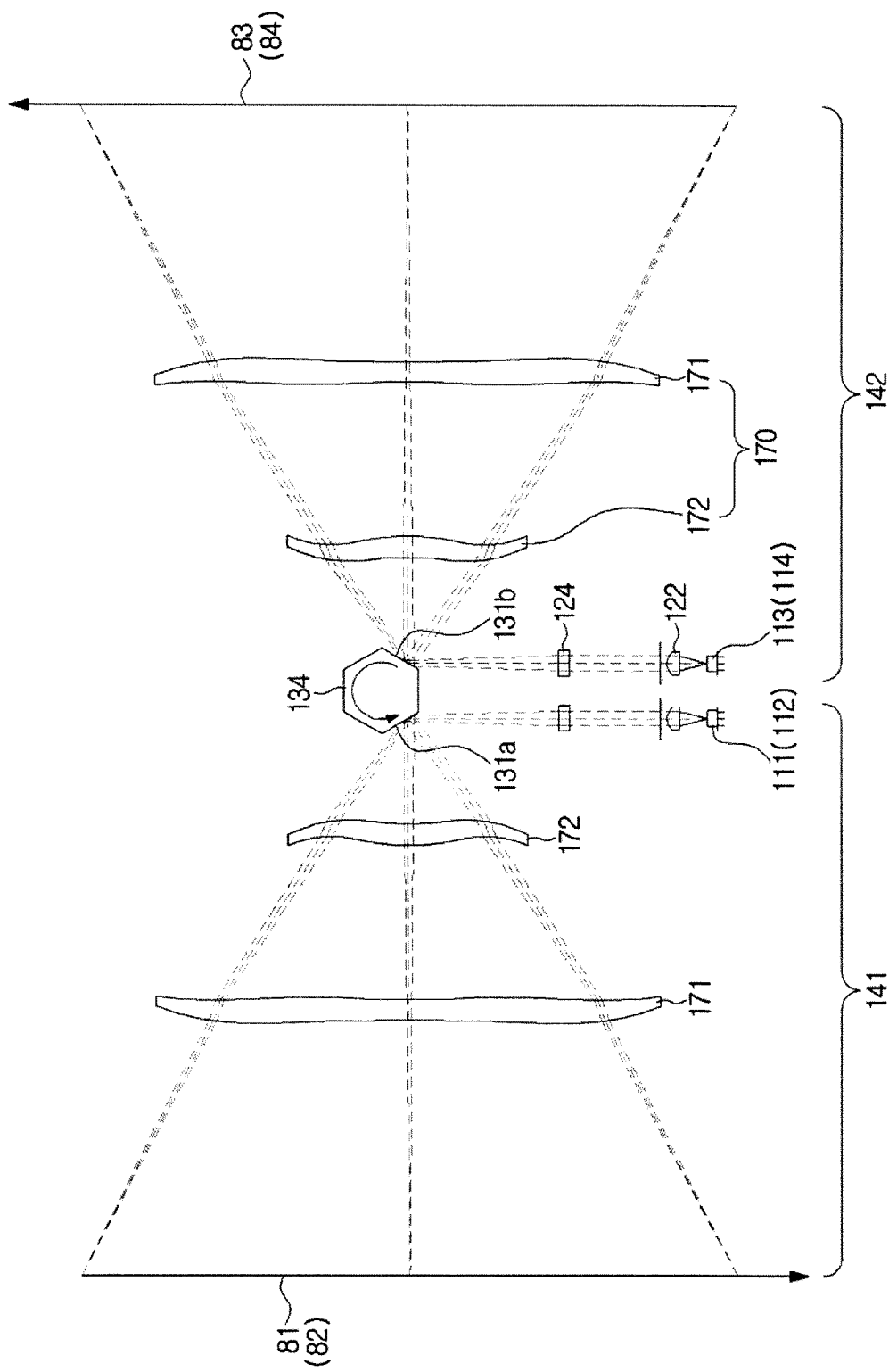
FIGS. 3 and 4 are diagrams schematically illustrating examples of an optical arrangement of an LSU in accordance with an embodiment of the disclosure.
Figure 4:
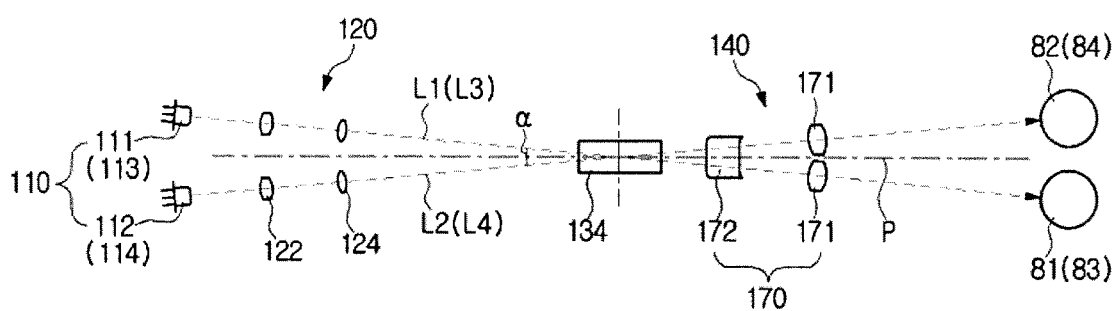
Figure 5:
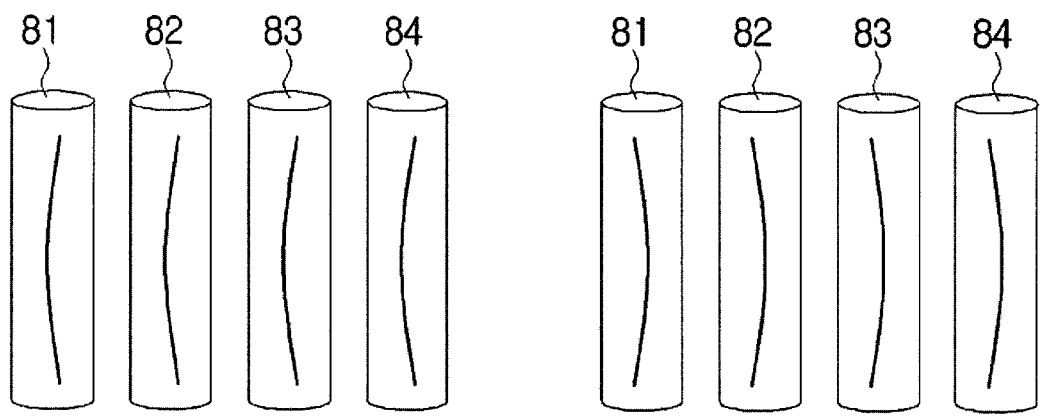
FIG. 5 is a diagram illustrating directions in which scan lines formed on a plurality of surfaces, which are to be scanned, by an LSU are bent, in accordance with an embodiment of the disclosure.

FIG. 2 is a cross-sectional view of an LSU in accordance with an embodiment of the disclosure. FIGS. 3 and 4 are diagrams schematically illustrating examples of an optical arrangement of an LSU in accordance with an embodiment of the disclosure. FIG. 5 is a diagram illustrating directions in which scan lines formed on a plurality of surfaces, which are to be scanned, by an LSU are bent, in accordance with an embodiment of the disclosure.

An LSU which forms an electrostatic latent image on photosensitive bodies 81, 82, 83, and 84 by scanning light on the photosensitive bodies 81, 82, 83, and 84 will be described below. The term "surface to be scanned" is a concept including a photosensitive body. For convenience of explanation, it is described in the embodiment that a surface to be scanned refers to a photosensitive body.

Before describing the LSU, a main scan direction (an X-axis) means a direction in which a light beam is scanned on a photosensitive body by an optical deflector 130, and corresponds to a direction of a scan line on the photosensitive body. A sub-scan direction (a Y-axis) refers to a direction in which a photosensitive drum is rotated.

The LSU 100 may include a housing 102, and a light window 104 which is formed on the housing 102 and through which light passes.

In the housing 102, elements which will be described below, such as a light source 110, an incident-light system 120, an optical imaging system 140, etc., may be arranged. The housing 102 is provided to protect these elements from the outside. The light window 104 is formed on the housing 102, and provided through which light is scanned from the inside of the housing 102 to the outside of the housing 102. A plurality of light windows 104 may be provided to correspond to a plurality of surfaces to be scanned.

The LSU 100 may include the light source 110, the incident-light system 120, and the optical imaging system 140.

The light source 110 may be provided to emit light beams L. The light source 110 may be a laser diode which emits laser beams. The light source 110 may include first to fourth light sources 111, 112, 113, and 114. The first to fourth light sources 111, 112, 113, and 114 may emit first to fourth light beams L1, L2, L3, and L4 modulated according to image information. The first and second light sources 111 and 112 may be arranged to appear overlapped with each other in a direction of the axis of rotation (an R-axis) as illustrated in FIG. 3. Similarly, the third and fourth light sources 113 and 114 may be arranged in parallel in the axis of rotation (the R-axis) such that they appear overlapped with each other as illustrated in FIG. 3. The light beams L1, L2, L3, and L4 emitted from the first to fourth light sources 111, 112, 113, and 114 are incident on the optical deflector 130, reflected by the optical deflector 130, and scanned on the surfaces 81, 82, 83, and 84 corresponding to various color components.

The incident-light system 120 may be arranged between the light source 110 and the optical deflector 130 of the optical imaging system 140. The incident-light system 120 may include a collimating lens 122 and a cylindrical lens 124. The collimating lens 122 is provided in a light path between the light source 110 and the optical deflector 130, and configured to make light beams emitted from the light source 110 to be parallel beams or beams which are substantially the same as parallel beams.

The cylindrical lens 124 may be arranged between the collimating lens 122 and the optical deflector 130. The cylindrical lens 124 focuses light beams passing through the collimating lens 122 in a direction corresponding to a main scan direction and/or a sub-scan direction. In some cases, the cylindrical lens 124 may be arranged between the light source 110 and the collimating lens 122 so that light beams passing through the cylindrical lens 124 may be incident on the collimating lens 122.

The optical deflector 130 is configured to deflect and scan light beams emitted from the light source 110. The optical deflector 130 may be provided to be rotatable. The light beams may be deflected and reflected from a reflective surface of the optical deflector 130 which is being rotated and be then scanned on a surface to be scanned.

The optical deflector 130 may include a rotational member 132 which is rotational, and a polygonal rotating mirror 134 provided to be rotatable when a turning force is applied thereto from the rotational member 132. Light beams incident on the polygonal rotating mirror 134 are emitted at a regular speed in the main scan direction through deflection reflective surfaces 131a and 131b which are being rotated at a high speed. The deflection reflective surfaces 131a and 131b on which light from the light source 110 is deflected and reflected may be changed through rotation of the optical deflector 130. The rotational member 132 has the axis of rotation (the R-axis) and is provided to be rotatable. The rotational member 132 may be provided to rotate the polygonal rotating mirror 134. The rotational member 132 may include a motor which generates a turning force to be applied to the polygonal rotating mirror 134.

The optical imaging system 140 may be arranged in a light path of a light beam between the optical deflector 130 and a surface to be scanned. The optical imaging system 140 may include a first optical imaging system 141 which supplies scanning beams to the first and second surfaces 81 and 82, and a second optical imaging system 142 which supplies scanning beams to the third and fourth surfaces 83 and 84. In the embodiment, the first and second optical imaging systems 141 and 142 are provided to be asymmetrical with respect to the optical deflector 130.

The optical imaging system 140 may include at least one optical imaging device 170 and at least one reflective member.

The at least one optical imaging device 170 may be an F-theta lens capable of performing scanning at a constant velocity in the main scan direction (the X-axis) while forming images of the light beams L1, L2, L3, and L4 deflected by the optical deflector 130 on the plurality of surfaces 81, 82, 83, and 84. The F-theta lens may be formed to include plastic. The at least one reflective member may be provided to fold a light path of light beams, thereby minimizing an internal space of the LSU 100. Furthermore, the at least one reflective member may change a direction in which a scan line is bent.

In the embodiment, the plurality of surfaces 81, 82, 83, and 84 to be scanned should be understood to include photosensitive bodies as described above. An electrostatic latent image may be formed on a photosensitive body by scanning a light beam on the photosensitive body. The number of surfaces to be scanned is not limited, and four surfaces to be scanned are provided in the embodiment. In detail, four photosensitive bodies corresponding to yellow, magenta, cyan, and black are provided.

Characteristics of elements in accordance with an embodiment of the disclosure will be described with reference to FIGS. 2 to 5 below.

In FIG. 3, reference numerals are assigned to elements through which the first and third light sources 111 and 113 pass, and reference numerals are assigned in parentheses to elements through which the second and fourth light sources 112 and 114 pass. In FIG. 4, reference numerals are assigned to elements of the first optical imaging system 141, and reference numerals are assigned in parentheses to elements of the second optical imaging system 142.

The first and second light sources 111 and 112 emit light beams L1 and L2 in a direction of a diagonal line inclined at a predetermined angle. The light beams L1 and L2 are emitted at an included angle α such that they become adjacent to each other in a direction in which light travels. To this end, the first and second light sources 111 and 112 spaced from each other in the direction of the axis of rotation (the R-axis) may be tilted and installed to have a predetermined angle with respect to a plane P. In order to simultaneously deflect and scan different light beams by a common beam deflector, the light beams should be divided and scanned on photosensitive bodies corresponding thereto after the light beams are deflected. Thus, the light beams are obliquely incident on the optical deflector 130 to spatially divide the light beams.

The light beams L1 and L2 incident on the optical deflector 130 are incident on the deflection reflective surface 131a such that the light beams L1 and L2 become adjacent to each other in a direction in which light travels. The light beams L1 and L2 cross each other or are adjacent to each other on the deflection reflective surface 131a. An effective reflective surface of the optical deflector 130 may be reduced in size by limiting positions at which images of the light beams L1 and L2 are formed to be within a predetermined range as described above. Thus, costs incurred to manufacture and drive the optical deflector 130 may be reduced. The light beams L1 and L2 reflected from the deflection reflective surface 131a are dispersed as they travel to be distant from each other and then travel toward photosensitive bodies corresponding thereto.

The collimating lens 122 and the cylindrical lens 124 may be sequentially arranged in a light path between the light sources 111 and 112 and the optical deflector 130. Through an action of the collimating lens 122, the light beams L1 and L2 emitted in a radial form from the light source 110 are converted into parallel beams or beams substantially the same as parallel beams, focused in the sub-scan direction (the Y-axis) while passing through the cylindrical lens 124 having refractive power in the sub-scan direction (the Y-axis), and then concentrated on the optical deflector 130. Thus, images of the light beams L1 and L2 are formed on the deflection reflective surface 131a of the optical deflector 130 in the form of a line extending to be long in the main scan direction (the X-axis). The collimating lens 122 and the cylindrical lens 124 may be sequentially arranged in a light path between the third and fourth light sources 113 and 114 and the optical deflector 130, and a detailed description thereof is substantially the same as the above description.

Light beams reflected from the optical deflector 130 are incident on the at least one optical imaging device 170. The at least one optical imaging device 170 may be an F-theta lens. The at least one optical imaging device 170 may include different F-theta lenses arranged in forward and backward directions of a light path. A first F-theta lens arranged at a side of the optical deflector 130 may be commonly formed with respect to different light beams divided in the sub-scan direction. A second F-theta lens arranged at a side of a photosensitive body may be provided separately in a light path of each of different respective light beams.

The optical imaging system 140 may be arranged in a light path between the optical deflector 130 and the surfaces 81, 82, 83, and 84. In the optical imaging system 140, the first optical imaging system 141 and the second optical imaging system 142 may be formed to be asymmetrical with respect to the optical deflector 130. During a scanning process, scan lines may be bent. Thus, when the optical imaging system 140 has an asymmetrical structure as described above, scan lines formed on a plurality of surfaces to be scanned may be bent in the same direction as illustrated in FIG. 5. Thus, although the scan lines are bent, color registration may be appropriately performed and the efficiency of forming an image may be improved. Furthermore, the number of elements of the at least one reflective member may be decreased and the structure thereof may be improved.

For convenience of explanation, a plurality of reflective members will be described with respect to first to sixth reflective members 151, 152, 153, 154, 155, and 156 on the basis of FIG. 2. Similarly, for convenience of explanation, a plurality of surfaces to be scanned will be described with respect to the first to fourth surfaces 81, 82, 83, and 84 in a direction from the left to the right on the basis of FIG. 2. The first reflective member 151 corresponds to the first surface 81. The second and fifth reflective members 152 and 155 correspond to the second surface 82. The third and sixth reflective members 153 and 156 correspond to the third surface 83. The fourth reflective member 154 corresponds to the fourth surface 84.

Here, light deflected and reflected by the optical deflector 130 is transmitted to the first to fourth reflective members 151, 152, 153, and 154. The fifth and sixth reflective members 155 and 156 are provided to reflect light reflected from the second and third reflective members 152 and 153 to the second and third surfaces 82 and 83. Thus, the first to fourth reflective members 151, 152, 153, and 154 may be referred to as primary reflective members 161, and the fifth and sixth reflective members 155 and 156 may be referred to as secondary reflective members 162.

The plurality of surfaces to be scanned may include the second surface 82 adjacent to the optical deflector 130, and the third surface 83 adjacent to another surface of the second surface 82 with respect to the axis of rotation of the optical deflector 130.

The plurality of reflective members may include the second reflective member 152 arranged in a light path between the optical deflector 130 and the second surface 82 and configured to reflect light from the optical deflector 130, and the third reflective member 153 arranged in a light path between the optical deflector 130 and the third surface 83 and configured to reflect light from the optical deflector 130. The third reflective member 153 may be arranged to be spaced from the first reflective member 151 in a direction of the axis of rotation (the R-axis) of the optical deflector 130.

The second reflective member 152 may be located above a plane P (see FIG. 2) which passes through the optical deflector 130 and which is perpendicular to the axis of rotation of the optical deflector 130, and the third reflective member 153 may be located below the plane P. That is, light beams emitted from the second and third light sources 112 and 113 and deflected by the optical deflector 130 may respectively arrive at the second reflective member 152 above the plane P and the third reflective member 153 below the plane P. In detail, a reflection point on a reflective surface of the second reflective member 152 and a reflection point on a reflective surface of the third reflective member 153 may be respectively located above and below the plane P. Through the above structure, the second reflective member 152 is provided to reflect light emitted upward from the second light source 112 and the third reflective member 153 is provided to reflect light emitted downward from the third light source 113.

The second light beam L2 reflected by the second reflective member 152 is reflected by the fifth reflective member 155 and scanned on the second surface 82. The third light beam L3 reflected by the third reflective member 153 is reflected by the sixth reflective member 156 and scanned on the third surface 83.

The first and fourth reflective members 151 and 154 are more distant from the optical deflector 130 than the second and third reflective members 152 and 153, and reflect the first and fourth light beams L1 and L4 to be respectively scanned on the first and fourth surfaces 81 and 84.

The first reflective member 151 is located below the plane P, and the fourth reflective member 154 is located above the plane P. That is, light beams emitted from the first and fourth light sources 111 to 114 and deflected by the optical deflector 130 may respectively arrive at the first reflective member 151 below the plane P and the fourth reflective member 154 above the plane P. In detail, a reflection point on a reflective surface of the first reflective member 151 and a reflection point on a reflective surface of the fourth reflective members 154 may be respectively located below and above the plane P. Through the above structure, the first reflective member 151 is provided to reflect light emitted downward from the first light source 111 and the fourth reflective member 154 is provided to reflect light emitted upward from the fourth light source 114.

The first to fourth reflective members 151, 152, 153, and 154, i.e., the plurality of primary reflective members 161, may be arranged to correspond to the first to fourth surfaces 81, 82, 83, and 84, and arranged in an alternate pattern with respect to the plane P which passes through the optical deflector 130 and is perpendicular to the axis of rotation of the optical deflector 130. For example, the reflection points on the reflective surfaces of the first and third reflective members 151 and 153 may be located below the plane P, and the reflection points on the reflective surfaces of the second and fourth reflective members 152 and 154 may be located above the plane P. By arranging the first to fourth reflective members 151, 152, 153, and 154 to be asymmetrical with respect to the optical deflector 130 as described above, scan lines scanned on the plurality of surfaces 81, 82, 83, and 84 may be bent in the same direction. Furthermore, the second and third reflective members 152 and 153 may be formed to be spaced the same distance from each other in a direction perpendicular to the axis of rotation of the optical deflector 130. Similarly, the first and fourth reflective members 151 and 154 may be formed to be spaced the same distance from each other in a direction perpendicular to the axis of rotation of the optical deflector 130. Through the above structure, interference between the at least one optical imaging device 170 and a light path may be minimized to improve the degree of freedom of layout in the LSU 100.

The first reflective member 151 and the fourth reflective member 154 may be arranged to be spaced a first distance d1 from each other in the direction of the axis of rotation of the optical deflector 130. Furthermore, the first surface 81 adjacent to the plane P passing through the optical deflector 130 and the fourth surface 84 farthest from the plane P may be arranged to be spaced the first distance d1 in the axis of rotation of the optical deflector 130. The second and third surfaces 82 and 83 may be obliquely arranged at a certain angle and in parallel between the first and fourth surfaces 81 and 84. As described above, as the plurality of reflective members 151, 152, 153, 154, 155, and 156 are arranged to be asymmetrical with respect to the optical deflector 130, a change in the length of a light path to the first to fourth surfaces 81, 82, 83, and 84 may be compensated for.

The arrangement of the plurality of reflective members described above will be described with respect to a plurality of light sources 110 below. The light source 110 may include the first to fourth light sources 111, 112, 113, and 114 as described above. The first and second light sources 111 and 112 may be arranged above and below the plane P in the direction of the axis of rotation (the R-axis). Similarly, the third and fourth light sources 113 and 114 may be arranged above and below the plane P in the direction of the axis of rotation (the R-axis).

The second light source 112 may emit light, which is to be scanned on the second reflective member 152, to be obliquely incident on the optical deflector 130, and be provided below the plane P. That is, the second light source 112 is provided to emit light upward toward the second reflective member 152. In contrast, the third light source 113 may emit light, which is to be scanned on the third reflective member 153, to be obliquely incident on the optical deflector 130, and be provided above the plane P. That is, the third light source 113 is provided to emit light downward toward the third reflective member 153. The second and third light sources 112 and 113 emit light to be incident on different deflection reflective surfaces 131a and 131b of the optical deflector 130 and thus the second and third light beams L2 and L3 are deflected in different directions. However, when the light sources 112 and 113 are set to scan light in opposite directions as described above, scan lines on the second and third surfaces 82 and 83 may be bent in the same direction.

Similarly, the first light source 111 may emit light, which is to be scanned on the first reflective member 151, to be obliquely incident on the optical deflector 130, and be provided above the plane P. That is, the first light source 111 is provided to emit light downward toward the first reflective member 151. In contrast, the fourth light source 114 may emit light, which is to be scanned on the fourth reflective member 154, to be obliquely incident on the optical deflector 130, and be provided below the plane P. That is, the fourth light source 114 is provided to emit light upward toward the fourth reflective member 154.

It is described in the embodiment that the plurality of primary reflective members 161 include the first to fourth reflective members 151, 152, 153, and 154 and the plurality of secondary reflective members 162 include the fifth and sixth reflective members 155 and 156. However, the plurality of primary and secondary reflective members 161 and 162 are not limited thereto.

The plurality of secondary reflective members 162 are provided to correspond to the plurality of primary reflective members 161 to reflect light beams reflected from the plurality of primary reflective members 161 to the plurality of surfaces 81, 82, 83, and 84, so that the same number of secondary reflective members 162 are arranged for the primary reflective members 161 in opposite directions with respect to the axis of rotation of the optical deflector 130.

The number of secondary reflective members 162 corresponding to each of the primary reflective members 161 adjacent to the optical deflector 130 among the primary reflective members 161 may be odd-number times greater than that of secondary reflective members 162 corresponding to each of the other primary reflective members 161 arranged farther from the optical deflector 130.

That is, in the embodiment, the fifth and sixth reflective members 155 and 156 respectively correspond to the second and third reflective members 152 and 153 which are the primary reflective members 161 adjacent to the optical deflector 130. No secondary reflective members 162 correspond to the first and fourth reflective members 151 and 154 farther from the optical deflector 130 than the second and third reflective members 152 and 153.

As described above, the number of the secondary reflective members 162 corresponding to each of the primary reflective members 161 adjacent to the optical deflector 130 is odd-number times greater than that of the secondary reflective members 162 corresponding to each of the other primary reflective members. Thus, scan lines on a plurality of surfaces to be scanned may be bent in the same direction.

A plurality of optical imaging devices 170 may include at least one first optical imaging device 171 between the first, fourth, fifth, and sixth reflective members 151, 154, 155, and 156 and the optical deflector 130 before a plurality of surfaces to be scanned.

At least one optical imaging device 170 may be also provided in a light path to the first and second reflective members 151 and 152 from the optical deflector 130. That is, the plurality of optical imaging devices 170 may include a second optical imaging device 172 commonly provided in a pair of light paths in which light deflected by the optical deflector 130 arrives at the first and second reflective members 151 and 152.

Similarly, at least one optical imaging device 170 may be provided in a light path from the optical deflector 130 to the third and fourth reflective members 153 and 154. The plurality of optical imaging devices 170 may include a third optical imaging device 173 commonly provided in a pair of light paths in which light deflected by the optical deflector 130 arrives at the third and fourth reflective members 153 and 154.

An LSU and an image forming apparatus including the same in accordance with an embodiment of the disclosure will be described below.

Figure 6:
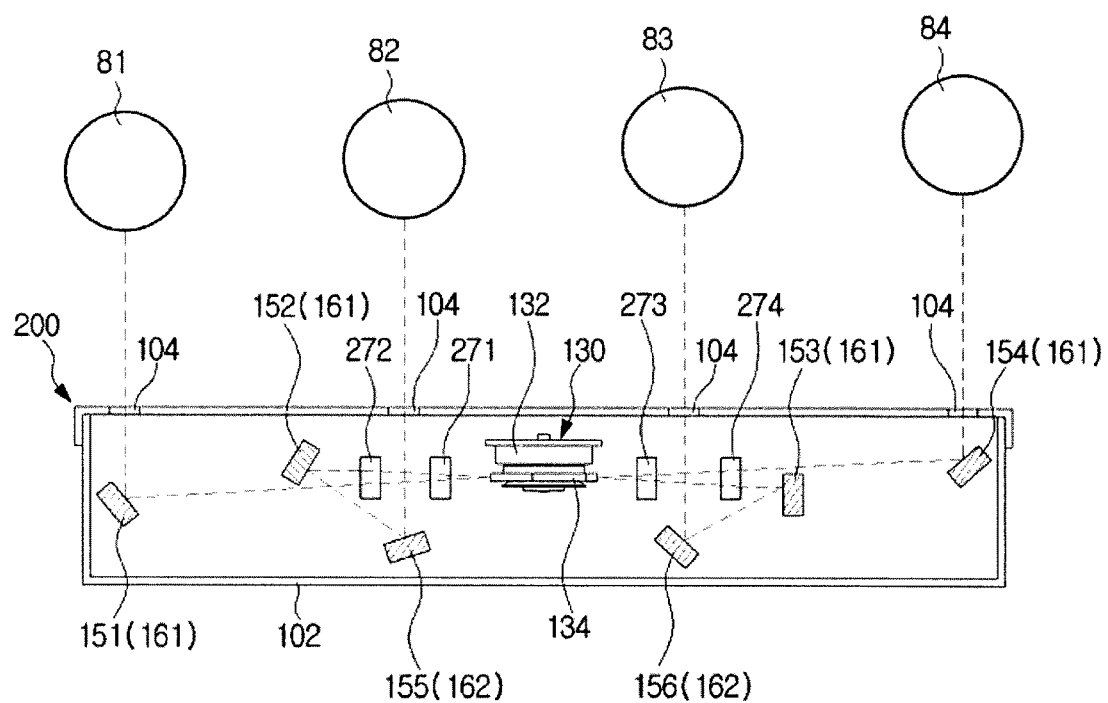
FIG. 6 is a cross-sectional view of an LSU in accordance with an embodiment of the disclosure.

FIG. 6 is a cross-sectional view of an LSU 200 in accordance with an embodiment of the disclosure.

In the embodiment, the arrangement of optical imaging devices is different from that in the embodiment of FIG. 2.

A plurality of optical imaging devices may include first and second optical imaging devices 271 and 272.

The first and second optical imaging devices 271 and 272 may be commonly provided in a pair of light paths in which light deflected by an optical deflector 130 arrives at first and second reflective members 151 and 152. The first and second optical imaging devices 271 and 272 are provided commonly for a light path in which light beams L1 and L2 arriving at first and second surfaces 81 and 82 which are to be scanned travel.

The plurality of optical imaging devices may include third and fourth optical imaging devices 273 and 274.

The third and fourth optical imaging devices 273 and 274 may be commonly provided in a pair of light paths in which light deflected by the optical deflector 130 arrives at third and fourth reflective members 153 and 154. The third and fourth optical imaging devices 273 and 274 may be commonly provided in a light path in which light beams L3 and L4 arriving at third and fourth surfaces 83 and 84 which are to be scanned travel.

In the embodiment, a pair of optical imaging devices are commonly provided in a light path in which light beams arriving at the first and second surfaces 81 and 82 travel and a pair of optical imaging devices are commonly provided in a light path in which light beams arriving at the third and fourth surfaces 83 and 84 travel, but the number of these optical imaging devices is not limited.

An LSU and an image forming apparatus including the same in accordance with an embodiment of the disclosure will be described below.

Figure 7:
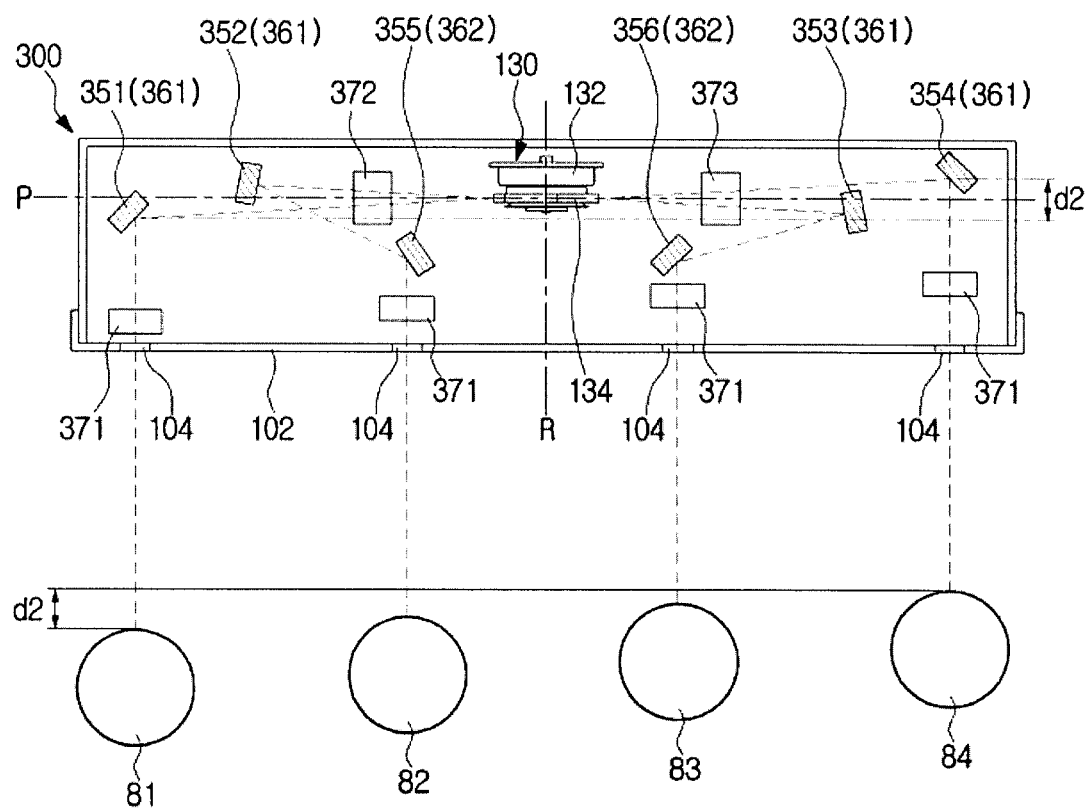
FIG. 7 is a cross-sectional view of an LSU in accordance with an embodiment of the disclosure.

FIG. 7 is a cross-sectional view of an LSU in accordance with an embodiment of the disclosure.

In the LSU 300 in accordance with the embodiment, the arrangement of a plurality of reflective members 351, 352, 353, 354, 355, and 356 is the same as that in the embodiment of FIG. 2. Furthermore, the arrangement of primary reflective members 361 and secondary reflective members 362 are the same as that in the embodiment of FIG. 2.

In the embodiment, a path of light reflected from the fifth and sixth reflective members 355 and 356 is provided to travel toward second and third surfaces 82 and 83 to be scanned while not being interfered with another path of light.

A plurality of surfaces 81, 82, 83, and 84 to be scanned may be provided below the LSU 300. A plurality of light windows 104 corresponding to the plurality of surfaces 81, 82, 83, and 84 may be formed on a bottom surface of a housing 102.

The first, fourth, fifth, and sixth reflective members 351, 354, 355, and 356 among the plurality of reflective members 351, 352, 353, 354, 355, and 356 are provided to scan light beams on the plurality of surfaces 81, 82, 83, and 84 arranged below the LSU 300 at an angle of reflection different from that in the embodiment of FIG. 2.

The first reflective member 351 and the fourth reflective member 354 may be arranged to be spaced a second distance d2 from each other in a direction of the axis of rotation of an optical deflector 130 (an R-axis). The fourth surface 84 adjacent to a plane P passing through the optical deflector 130 and the first surface 81 farthest from the plane P may be also arranged to be spaced the second distance d2 from each other in the direction of the axis of rotation of the optical deflector 130 (the R-axis). The second and third surfaces 82 and 83 may be tilted at a certain angle and arranged in parallel between the first and fourth surfaces 81 and 84. As described above, the plurality of reflective members 351, 352, 353, 354, 355, and 356 are arranged to be asymmetrical with respect to the optical deflector 130, thereby compensating for a change in the length of a light path to the first to fourth surfaces 81, 82, 83, and 84.

A plurality of optical imaging devices may include a plurality of first optical imaging devices 371 such that at least one of the plurality of first optical imaging devices 371 is arranged between the plurality of surfaces 81, 82, 83, and 84 and the first, fourth, fifth, and sixth reflective members 351, 354, 355, and 356. By arranging the plurality of first optical imaging devices 371 between the first, fourth, fifth, and sixth reflective members 351, 354, 355, and 356 and the plurality of surfaces 81, 82, 83, and 84, they may be prevented from being interfered with other elements and utilization of an internal space of the housing 102 of the LSU 300 may be improved.

At least one optical imaging device may be also provided in a light path from the optical deflector 130 to the first and second reflective members 351 and 352. That is, the plurality of optical imaging devices may include a second optical imaging device 372 commonly provided in a pair of light paths in which light deflected by the optical deflector 130 arrives at the first and second reflective members 351 and 352.

Similarly, at least one optical imaging device may be provided in a light path from the optical deflector 130 to the third and fourth reflective members 353 and 354. The plurality of optical imaging devices may include a third optical imaging device 373 commonly provided in a pair of light paths in which light deflected by the optical deflector 130 arrives at the third and fourth reflective members 353 and 354.

An LSU and an image forming apparatus including the same in accordance with an embodiment of the disclosure will be described below.

Figure 8:
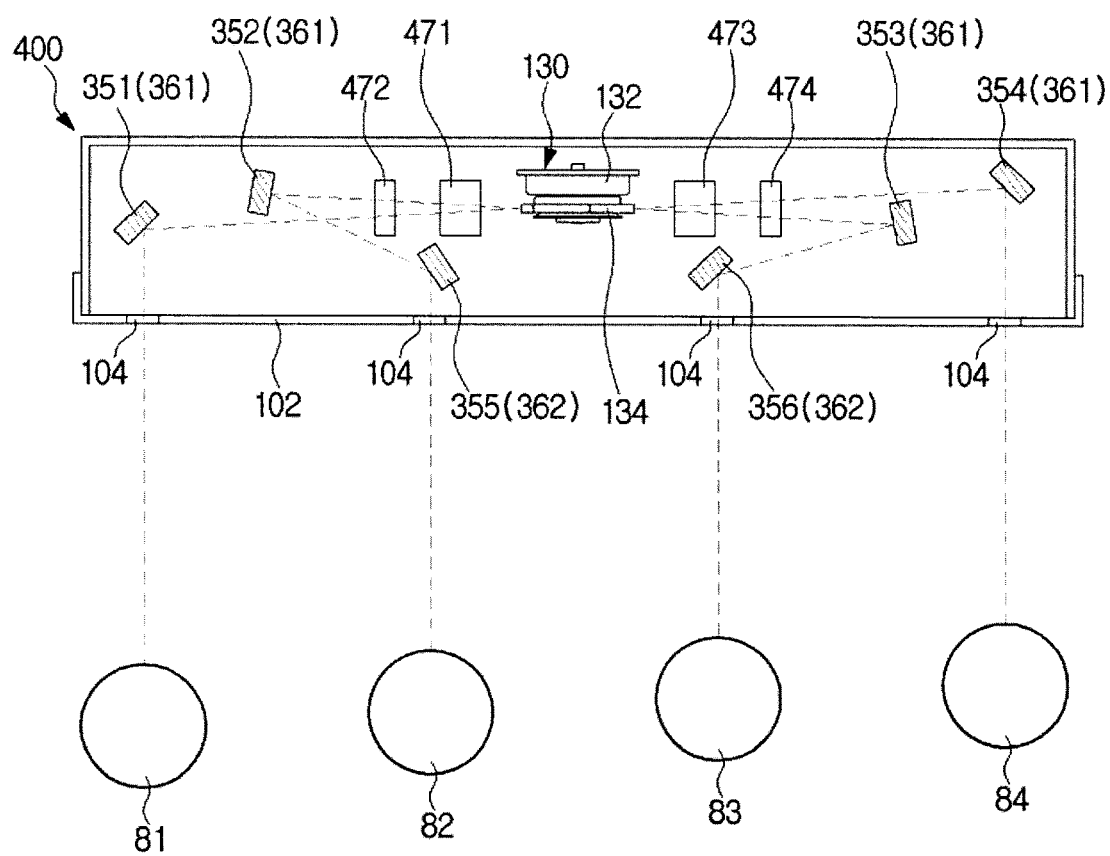
FIG. 8 is a cross-sectional view of an LSU in accordance with an embodiment of the disclosure.

FIG. 8 is a cross-sectional view of an LSU 400 in accordance with an embodiment of the disclosure.

In the embodiment, the arrangement of a plurality of optical imaging devices is different from that in the embodiment of FIG. 7.

The plurality of optical imaging devices may include first and second optical imaging devices 471 and 472.

The first and second optical imaging devices 471 and 472 may be commonly provided in a pair of light paths in which light deflected by an optical deflector 130 arrives at first and second reflective members 351 and 352. The first and second optical imaging devices 471 and 472 may be commonly provided in a light path in which light beams arriving at first and second surfaces 81 and 82 to be scanned travel.

The plurality of optical imaging devices may include third and fourth optical imaging devices 473 and 474.

The third and fourth optical imaging devices 473 and 474 may be commonly provided in a pair of light paths in which light deflected by the optical deflector 130 arrives at third and fourth reflective members 353 and 354. The third and fourth optical imaging devices 473 and 474 may be commonly provided in a light path in which light beams arriving at third and fourth surfaces 83 and 84 to be scanned travel.

An LSU and an image forming apparatus including the same in accordance with an embodiment of the disclosure will be described below.

Figure 9:
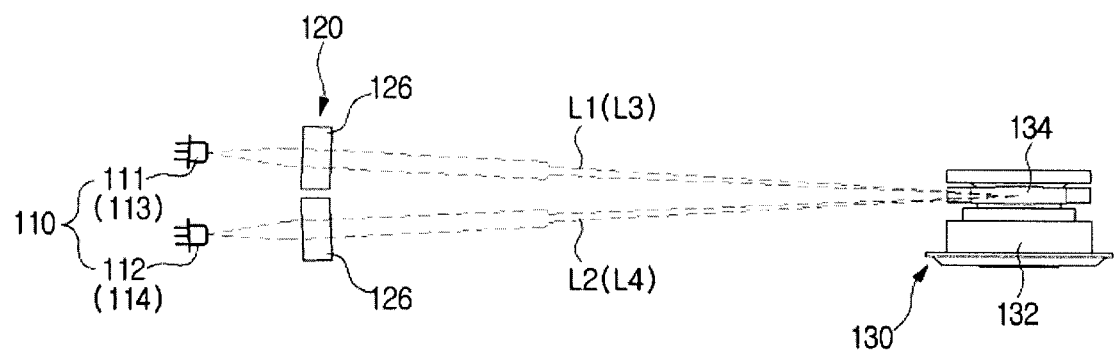
FIG. 9 is a cross-sectional view of an LSU in accordance with an embodiment of the disclosure.

FIG. 9 is a cross-sectional view of an LSU in accordance with an embodiment of the disclosure.

An incident-light system 120 may be arranged between a light source 110 and an optical deflector 130 of an optical an imaging system 140.

The incident-light system 120 may include an anamolphic lens 126. The anamolphic lens 126 may be provided in a light path between the light source 110 and the optical deflector 130, and focus light beams emitted from the light source 110 in a direction corresponding to a main scan direction and/or a sub-scan direction while making the light beams to be parallel beams or light beams substantially the same as parallel beams.

As is apparent from the above description, in an LSU and an image forming apparatus having the same in accordance with the disclosure, the structure of the LSU may be improved to enhance the quality of an image.

By changing the arrangement of a plurality of reflective members, the degree of freedom of layout of a light path may be increased.

Furthermore, scan lines of the LSU may be controlled to be bent in the same direction, thereby improving the registration of a plurality of colors.

In addition, since the number of internal components of the LSU may be decreased, the cost of materials may be reduced and the LSU may be manufactured in a compact size.

Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A light scanning unit, comprising:
   a housing;
   a plurality of light sources;
   an optical deflector including a rotational member having an axis of rotation about which the rotational member is to rotate, and disposed to deflect light incident obliquely from the plurality of light sources;
   a plurality of reflective members disposed to reflect the light deflected by the optical deflector to a plurality of surfaces, which are to be scanned and correspond to the plurality of light sources, and disposed such that scan lines on surfaces disposed on opposite sides of the axis of rotation of the optical deflector among the plurality of surfaces to be scanned are bent in a same direction, the plurality of reflective members including:
      a first reflective member to reflect light from the optical deflector,
      a second reflective member to reflect light from the optical deflector,
      a third reflective member to reflect the light reflected from the first reflective member to a first surface among the plurality of surfaces, and
      a fourth reflective member to reflect the light reflected from the second reflective member to a second surface among the plurality of surfaces;
   a first optical imaging device provided on a light path between the third reflective member and the first surface; and
   a second optical imaging device provided on a light path between the fourth reflective member and the second surface, the second optical imaging device being more distant from an inner side of the housing than the first optical imaging device, and the inner side of the housing being between the plurality of reflective members and the plurality of surfaces.

2. The light scanning unit according to claim 1, wherein the plurality of reflective members are disposed to be asymmetrical about the axis of rotation of the optical deflector.

3. The light scanning unit according to claim 1, wherein the first surface is disposed at one side with respect to the axis of rotation; and
   the second surface is disposed at another side with respect to the axis of rotation, and
   the second reflective member is disposed to be spaced apart from the first reflective member in a direction of the axis of rotation of the optical deflector.

4. The light scanning unit according to claim 3, wherein the plurality of light sources include:
   a first light source to generate light to be scanned, and disposed below a plane which passes through the optical deflector and is perpendicular to the axis of rotation of the optical deflector; and
   a second light source configured to generate light to be scanned, and disposed above the plane.

5. The light scanning unit according to claim 3, wherein each of the first reflective member and the second reflective member includes a reflection point at which light incident from the optical deflector is reflected,
   the reflection point on the first reflective member is disposed above a plane which passes through the optical deflector and is perpendicular to the axis of rotation of the optical deflector, and
   the reflection point on the second reflective member is disposed below the plane.

6. The light scanning unit according to claim 3, wherein the first and second reflective members are disposed to be spaced apart a same distance from the axis of rotation of the optical deflector.

7. The light scanning unit according to claim 3, wherein the first surface is more distant from the housing than the second surface in a direction parallel to the axis of rotation of the optical deflector.

8. The light scanning unit according to claim 7, wherein the third and fourth reflective members are disposed such that light reflected from the third and fourth reflective members is not interfered with by a light path from the optical deflector to the first and second reflective members.

9. The light scanning unit according to claim 7, wherein the plurality of surfaces to be scanned further include:
   a third surface disposed more distant from the optical deflector than the first surface in a direction perpendicular to the axis of rotation of the optical deflector, and
   a fourth surface disposed more distant from the optical deflector than the second surface in a direction perpendicular to the axis of rotation of the optical deflector, and
the plurality of reflective members further include:
   a fifth reflective member including a reflection point at which light deflected by the optical deflector is reflected to the third surface, the reflection point disposed below the plane, and
   a sixth reflective member including a reflection point at which light deflected by the optical deflector is reflected to the fourth surface, the reflection point disposed above the plane.

10. The light scanning unit according to claim 9, wherein the fifth reflective member and the sixth reflective member are disposed to be spaced apart by a first distance from each other in the direction parallel to the axis of rotation of the optical deflector, and
the third surface and the fourth surface are disposed to be spaced apart by the first distance from each other in the direction parallel to the axis of rotation of the optical deflector.

11. The light scanning unit according to claim 9, wherein the fifth and sixth reflective members are disposed to be spaced apart a same distance from the axis of rotation of the optical deflector in the direction perpendicular to the axis of rotation of the optical deflector.

12. The light scanning unit according to claim 1, further comprising:
   a third optical imaging device provided on a light path between the optical deflector and the first reflective member; and
   a fourth optical imaging device provided on a light path between the optical deflector and the second reflective member.

13. The light scanning unit according to claim 12, wherein at least one of the first, second, third, and fourth optical imaging devices includes an F-theta lens.

14. The light scanning unit according to claim 13, wherein at least two of the first, second, third, and fourth optical imaging devices includes F-theta lenses.

15. An image forming apparatus, comprising:
a plurality of photosensitive bodies; and
a light scanning unit configured to form an electrostatic latent image on the plurality of photosensitive bodies, the light scanning unit including:
   a plurality of light sources,
   an optical deflector to deflect light incident obliquely from the plurality of light sources, and
   a plurality of reflective members to reflect light deflected by the optical deflector to the plurality of photosensitive bodies, the plurality of reflective members including a plurality of primary reflective members disposed to correspond to the plurality of photosensitive bodies and each of which includes a reflection point at which light from the optical deflector is reflected,
wherein
the reflection points of the plurality of primary reflective members are disposed in an alternate pattern with respect to a plane such that scan lines on the plurality of photosensitive bodies are bent in a same direction,
the plane passes through the optical deflector and is perpendicular to an axis of rotation of the optical deflector, and
a first primary reflective member among the plurality of primary reflective members, disposed on one side of the axis of rotation of the optical deflector, is to reflect light to a first photosensitive body among the plurality of photosensitive bodies,
a second primary reflective member among the plurality of primary reflective members, disposed on another side of the axis of rotation of the optical deflector, is to reflect light to a second photosensitive body among the plurality of photosensitive bodies,
the first photosensitive body is spaced apart from the plane in a direction parallel to the axis of rotation of the optical deflector by a first distance, and
the second photosensitive body is spaced apart from the plane in the direction parallel to the axis of rotation of the optical deflector by a second distance, the second distance being less than the first distance.

16. The image forming apparatus according to claim 15, wherein the first and second primary reflective members are spaced apart from the plane in the direction parallel to the axis of rotation of the optical deflector by a same distance.

17. The image forming apparatus according to claim 15, wherein
the plurality of reflective members further include a plurality of secondary reflective members disposed so as to reflect light reflected from corresponding primary reflective members to corresponding photosensitive bodies,
a same number of secondary reflective members are disposed on the one side of the axis of rotation of the optical deflector as are disposed on the another side of the axis of rotation of the optical deflector, and
a number of secondary reflective members disposed to correspond to each of the primary reflective members adjacent to the optical deflector among the plurality of primary reflective members is greater than a number of secondary reflective members disposed to correspond to each of the other primary reflective members disposed farther from the optical deflector than the primary reflective members disposed adjacent to the optical deflector.

18. The image forming apparatus according to claim 15, wherein
the first and second primary reflective members are each spaced apart from the plane in the direction parallel to the axis of rotation of the optical deflector by a third distance, and
a difference between the first distance and the second distance is equal to twice the third distance.

19. A light scanning unit, comprising:
a housing;
a plurality of light sources;

an optical deflector including a rotational member and disposed to deflect light incident obliquely from the plurality of light sources; and a plurality of reflective members, including:

first and second reflective members arranged to reflect light deflected by the optical deflector, the first reflective member being disposed on a first side of a plane that passes through the optical deflector and is perpendicular to an axis of rotation of the optical deflector, and the second reflective member being disposed on a second side of the plane, a third reflective member configured to reflect the light reflected from the first reflective member to a first surface to be scanned, the third reflective member being disposed on one side of an axis of rotation of the optical deflector and above on the second side of the plane, and a fourth reflective member to reflect the light reflected from the second reflective member to a second surface to be scanned, the fourth reflective member being disposed on another side of the axis of rotation of the optical deflector and on the second side of the plane, the second side of the plane being closer to the second surface than the first side of the plane;

a first optical imaging device provided on a light path between the third reflective member and the first surface; and a second optical imaging device provided on a light path between the fourth reflective member and the second surface, the second optical imaging device being more distant from an inner side of the housing than the first optical imaging device, and the inner side of the housing being between the plurality of reflective members and the plurality of surfaces.

20. The light scanning unit according to claim 19, wherein the plurality of reflective members further include:

a fifth reflective member, disposed on the second side of the plane, to reflect light deflected by the optical deflector to a third surface to be scanned, the third surface being disposed farther from the optical deflector than the first surface in a direction perpendicular to the axis of rotation of the optical deflector, and a sixth reflective member, disposed on the first side of the plane, to reflect light deflected by the optical deflector to a fourth surface to be scanned, the fourth surface being disposed farther from the optical deflector than the second surface in the direction perpendicular to the axis of rotation of the optical deflector.

* * * * *

UNITED STATES PATENT AND TRADEMARK OFFICE
CERTIFICATE OF CORRECTION

PATENT NO. : 10,218,871 B2
APPLICATION NO. : 15/353289
DATED : February 26, 2019
INVENTOR(S) : Jong-Wuk Ku Page 1 of 1

It is certified that error appears in the above-identified patent and that said Letters Patent is hereby corrected as shown below:

In the Claims

In Column 16, Line 51, in Claim 4, after "source" delete "configured".

In Column 17, Line 59, in Claim 15, after "unit" delete "configured".

In Column 19, Line 3, in Claim 19, after "sources;" delete "and".

In Column 19, Line 12, in Claim 19, after "member" delete "configured".

In Column 19, Line 16, in Claim 19, after "and" delete "above".

Signed and Sealed this
Twenty-eighth Day of May, 2019

Andrei Iancu
*Director of the United States Patent and Trademark Office*